(12) United States Patent
Von Borstel

(10) Patent No.: US 6,466,600 B1
(45) Date of Patent: Oct. 15, 2002

(54) LASER TUBE FOR HIGH-FREQUENCY LASER AND LASER INCORPORATING SAME

(75) Inventor: Michael Von Borstel, Pleidelsheim (DE)

(73) Assignee: Trumpf Lasertechnik GmbH, Ditzingen (DE)

( * ) Notice: Subject to any disclaimer, the term of this patent is extended or adjusted under 35 U.S.C. 154(b) by 0 days.

(21) Appl. No.: 09/285,545

(22) Filed: Apr. 2, 1999

(30) Foreign Application Priority Data

Apr. 3, 1998 (DE) .......................... 198 15 065

(51) Int. Cl.[7] .......................... H01S 3/03; H01S 3/097; H01S 3/09; H01S 3/08
(52) U.S. Cl. .............................. 372/61; 372/92; 372/87; 372/90
(58) Field of Search .............................. 372/61, 92, 81, 372/87, 90; 359/584; 65/17.1, 60.1

(56) References Cited

U.S. PATENT DOCUMENTS

| | | | |
|---|---|---|---|
| 3,516,010 A | | 6/1970 | Rasch et al. |
| 3,619,808 A | * | 11/1971 | Tomkins et al. ........... 331/94.5 |
| 4,897,848 A | | 1/1990 | Macken |
| 5,506,858 A | * | 4/1996 | Takenaka et al. ............. 372/92 |
| 5,513,039 A | * | 4/1996 | Lu et al. ..................... 359/584 |

FOREIGN PATENT DOCUMENTS

| | | |
|---|---|---|
| JP | 03194982 | 8/1991 |
| JP | 04053282 | 2/1992 |
| JP | 04348573 | 3/1992 |
| JP | 04295094 | 10/1992 |

\* cited by examiner

*Primary Examiner*—Paul Ip
*Assistant Examiner*—Armanda Rodriguez
(74) *Attorney, Agent, or Firm*—Pepe & Hazard LLP

(57) ABSTRACT

An HF-excited gas laser has a laser tube of ceramic material containing a laser gas, and the tube includes a chemical component which will preclude passage therethrough of secondary radiation of a wavelength within a proscribed range which would interact with the material of the laser tube to create defects therein. The chemical component to prevent damage to the laser tube may be provided as a layer on its inside surface which is essentially impermeable to and/or reflects the secondary radiation back into the lasing gas. Alternatively, the material of the laser tube may incorporate the chemical component, preferably over the portion of the wall adjacent its inner surface.

6 Claims, 2 Drawing Sheets

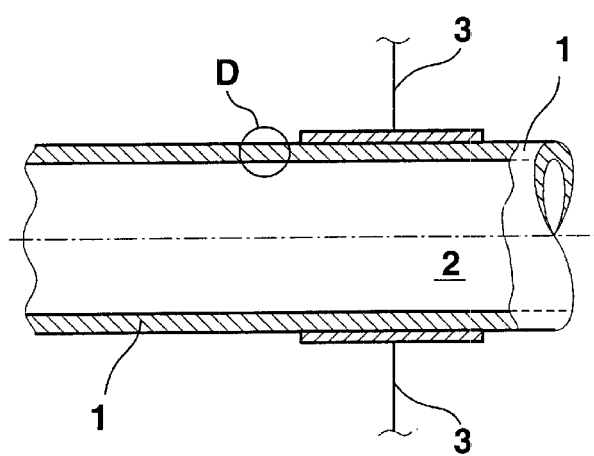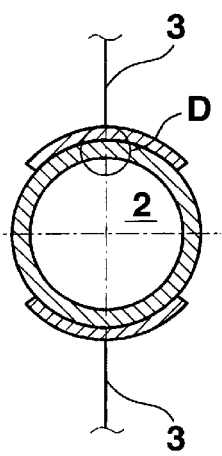
Fig. 1a Fig. 1b

LASER TUBE FOR HIGH-FREQUENCY LASER AND LASER INCORPORATING SAME

BACKGROUND OF THE INVENTION

The present invention relates to an HF-excited gas laser with at least one laser tube fabricated of quartz ($SiO_2$) or a ceramic or glass material, and in particular to such a laser tube which is resistant to the degradation by secondary radiation.

One of the most common industrial lasers is the $CO_2$ laser, which is used, for example, for material processing. Such lasers are used and marketed by Applicant's assignee, Trumpf GmbH And Co. in connection with cutting and/or welding devices. Von Borstel et al U.S. Pat. No. 5,115,446 granted May 19, 1992, may be referred to for further details as to the construction of such a gas laser.

Generally, such $CO_2$ lasers have a laser resonator, which, in order to reduce the space required, may consists of several laser tubes connected with each other by mirror units both as to flow dynamics and optically. On the outside of the laser tubes, there is a number of electrodes which excite the laser gas by high frequency discharges. The laser tubes preferably consist of quartz ($SiO_2$) with a wall thickness of a few millimeters.

In the case of laser tubes of this type, and in particularly in the case of $CO_2$ lasers, it is found that defects, such as melted areas, breaks or cracks, appear in the laser tubes after a large number of operating hours. Previously, it was not known what cause these breaks or cracks.

Even in the case of laser tubes which are fabricated of a ceramic material such as $Al_2O_3$, or of a glass material, after a certain number of operating hours the appearance of defects is observed. For example, in the case of laser tubes consisting of $Al_2O_2$ in $CO_2$ lasers, it is observed that holes form after a certain operating time so that the laser tube is no longer gas-tight.

The object of the present invention is to provide a laser in which the service life of the laser tubes, which, particularly those of quartz ($SiO_2$) or a ceramic or glass material, is prolonged in comparison with the service life of tubes of these materials made in accordance with the prior art.

SUMMARY OF THE INVENTION

A H—F excited gas laser which solves this problem on the basis of its design in accordance with the present invention, has a laser tube of ceramic material containing a laser gas (2). The wall of the laser tube includes a chemical component substantially precluding the passage therethrough of secondary radiation generated by the laser gas and having a wavelength in a proscribed range.

The invention is based on the following concept of the mechanism which leads to the formation of defects in of the laser tube.

During the operation of the laser in the case of HF-excited lasers and particularly, $CO_2$ lasers, it has been found that, in addition to the laser radiation of the desired UV wavelength, secondary radiation with a wave length in a range other than that of the desired laser radiation also appears in the lasing gas. For example, in the case of a $CO_2$ laser which emits laser light with a wave length of around 10.6 μm, there also appears radiation with wave lengths which extend from the visual range to the UV range to wave lengths which are clearly shorter than 250 nm.

This radiation, which is described herein as "secondary radiation" hereafter for the sake of simplicity, is not oriented parallel to the longitudinal axis of the laser tube, but can be at any angle to the longitudinal axis, so that, in particular, it strikes the laser tube and can interact with this material from which the tube is fabricated.

The interaction of this comparatively high-energy secondary radiation with the material of the laser tube causes changes in the structure of the laser tube material, which are described below as "defects". In particular, in the case of quartz ($SiO_2$), but also in the case of glasses and ceramics, defects and so-called color centers, such as E' centers, are created, and these have an electric dipole moment.

The dipoles of these defects can interact with the HF excitation energy being introduced through the tube. In this case, the defects can absorb a part of the excitation energy. The laser tube is changed locally by the absorbed energy and, in some cases, even melted locally. The stresses arising from the local alteration of the material after a certain number of operating hours—as a rule several thousand operating hours—lead to defects, such as breaks, cracks and/or holes in the laser tube. The defects can appear not only in the area through which the excitation energy is introduced into the laser gas, but also at other points.

Therefore, in accordance with the present invention, the laser tube is treated by suitable measures in such a way that the secondary radiation does not cause disabling defects in the material of the laser tube—particularly quartz—or so that the defects are limited to a very small area of the wall which is not dangerous for the operation of the laser. Thus, the breaks, cracks, melted spots, or holes which result from the absorption of the HF excitation energy in the secondary radiation are avoided or materially limited in location.

These measures are alternatively or cumulatively:

applying on the inside surface of the laser tube, a layer which is essentially impermeable to the secondary radiation and/or which reflects the secondary radiation (back) into the laser gas;

doping the material of the laser tube with foreign atoms or molecules in such a way that the secondary radiation is absorbed by the doping material in a manner which is "harmless" to the laser tube;

providing an additional inner tube, which absorbs or reflects the secondary radiation.

The layer provided on the inside of the laser tube in this case can be a vapor-deposited layer applied by a PVD or CVD process or a sol-gel process. The sol-gel process has the advantage in that it provides a simple way to coat the inside of the laser tube.

Examples of suitable layers are (1) an absorbing layer consisting of titanium oxide, cerium oxide, strontium oxide, or zirconium oxide, or a mixture of these oxides, or (2) a reflective layer and, in particular, a dichroic mirror layer of the type known from optics.

An additionally provided inner tube can form a composite structure with the actual outer laser tube. The additional tube in this case can absorb and/or reflect the secondary radiation.

The doping of the inner tube can be performed in very different ways and also act in very different ways. The doping material can reduce the depth of penetration of the UV radiation into the laser tube to such a small distance that the dipoles which interact with the HF excitation energy are formed only in a small border area of the laser tube, and not in the "main part" of the laser tube. Furthermore, the secondary radiation can be absorbed preferentially by the doping material instead of by the basic material of the laser tube. This can be done in such a way that there are formed no defects with a dipole moment to interact with the HF excitation energy and absorb it.

Suprisingly it has been found that, in the case of quartz as the basic material for the laser tube, nearly all defects leading to damage of the material of the laser tube are avoided if the doping material or the coating is chosen so that only UV light with a wave length of less that 250 nm is absorbed.

It has been shown that, in the case of other materials, the dangerous radiation which causes the defects with a dipole moment which interact with the HF excitation energy, can be in another wave length range, and, in a given case even in the visual range.

$TiO_2$ or titanium is a possible doping material in the case of a $CO_2$ laser and a laser tube consisting of quartz which absorbs UV radiation with a wave length shorter than 250 nm. Of course, other doping material also can be used instead of titanium or in addition to titanium.

The concentration of titanium as a doping material in quartz in this case is essentially higher than the concentration in which titanium typically is present as an impurity in commercially obtainable (natural or synthetic) quartz materials. In particular, the concentration is greater than 150 ppm and preferably lies in the range of 500 ppm and more.

In this case, the doping materials may be present in the required high concentration homogeneously—for example, by addition to the $SiO_2$ melt—or they may be incorporated only in a boundary layer adjacent the inner surface of the laser tube. Processes by which such a concentration in a boundary layer can be created are, for example, surface diffusion processes or ion exchange processes.

Of course, the measures in accordance with the invention are applicable to all kinds of laser gases, but they are particularly beneficial for $CO_2$ lasers using laser tubes made of quartz ($SiO_2$)

The measures in accordance with the invention can be used in the case of inductively or capacitatively excited gas lasers. However, they are particularly effective in the case of lasers in which at least one or both of the capacitatively exciting electrodes are located outwardly of the laser tube, so that the entire excitation energy has to go through the laser tube. In this case it is possible to use the preventive formation of the invention only in the area of the laser tube through which the HF energy is introduced.

BRIEF DESCRIPTION OF THE DRAWINGS

Exemplary of the present invention are the accompanying drawings wherein:

FIG. 1a is a fragmentary longitudinal cross section of a laser embodying the present invention;

FIG. 1b is a cross sectional view thereof;

FIGS. 2a–5a are fragmentary longitudinal sectional views of tubes employing different embodiments of the present invention; and FIGS. 2b–5b are cross sectional views thereof.

DETAILED DESCRIPTION OF THE PREFERRED EMBODIMENT

Figure 2A:
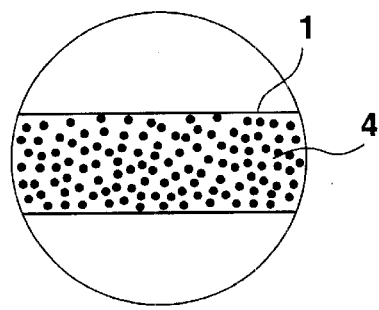

FIGS. 1 and 1b show a longitudinal section and cross-section of a laser tube 1 which, in the case of the embodiment shown and without limiting the general concept of the invention, consists of quartz with a wall thickness of a few millimeters. In the laser tube 1 there is a laser gas 2, which may be $CO_2$ without limiting the general concept of the invention. On the outside of the laser tube 1 are electrodes 3; only two electrodes lying opposite each other are shown in FIG. 1. A HF voltage, which capacitatively excites the gas 2 in the laser tube 1 to lasing activity, is applied to the electrodes 3, which may be in contact with the laser tube 1 or separated with a small air gap between them and the laser tube.

The construction of gas lasers described above is known in general; as for example, in to the $CO_2$ lasers sold by applicant's assignee and the aforementioned patent to which explicit reference is made for all design details not described here in greater detail.

In the case of a number of gas lasers, secondary radiation which frequently has a clearly shorter wave length than the desired laser radiation, arises in the gas discharge.

In the case of $CO_2$ lasers, the desired laser wave length is 6 μm, and the wave length of the secondary radiation is in the range from the visual range to the UV range. A very significant part of the secondary radiation has a wave length of less than 250 nm.

In accordance with the present invention, it was recognized that the radiation with a wave length of less than 250 nm creates defects which can interact with the HF excitation energy in a particularly harmful way. This UV radiation is at least partially absorbed by the material of the laser tube 1. During the absorption process, defects arise in the material, among others E' color centers. As a rule, the defects created have an electric dipole moment and the dipoles of the defects in this case can absorb a part of the HF energy introduced through the laser tube 1.

For example, in the case of $CO_2$ lasers which are used for material processing, HF energy in the range of several kW is introduced through the laser tube 1. A not inconsiderable part of this can be absorbed by the laser tube if there are very many defects with a dipole moment. The absorbed energy will heat the laser tube locally. In this case, the material can reach localized temperatures which lie above the melting temperature of the material. The localized heating and the subsequent cooling process after switching off the laser create stresses in the material of the laser tube 1. This can lead to defects such as breaks or cracks after a certain operating time. The breaks or cracks in this case can appear not only in the area of the laser tube 1 which is located adjacent the electrodes, but also at any point along the length of the laser tube 1.

The present invention provides the means by which the absorption by the laser tube 1 of the HF excitation energy is prevented. This in turn prevents the development of stresses which lead to a defect and finally to the destruction of the laser tube 1.

These means are explained below with reference to FIGS. 2–5 which show views of the detail D from FIG. 1 in longitudinal or cross-section.

Figure 2B:
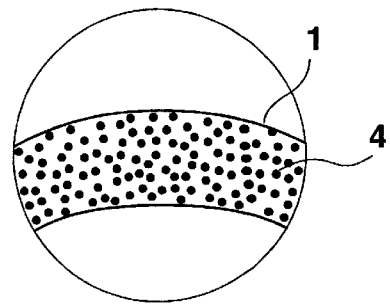

FIG. 2 shows a first embodiment in which a doping material 4 is introduced homogeneously into the material of the laser tube 1 for example, by stirring into an $SiO_2$ melt. $TiO_2$ or titanium can be used as doping material in the case of laser tubes 1 which consist of quartz.

Figure 3A:
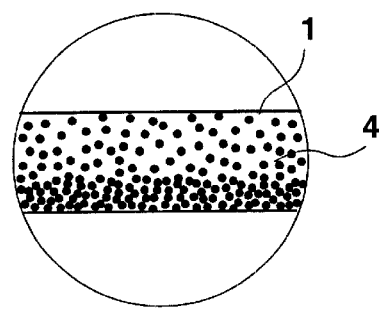
Figure 3B:
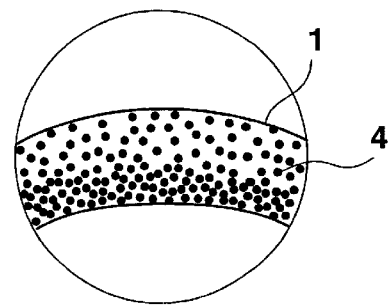

In the embodiment of FIG. 3, the doping material 4 is introduced into the laser tube 1 so that the concentration of the doping material 4 is greater adjacent the inner surface of the laser tube 1 and decreases toward the outer surface. In this case the concentration preferably is chosen to be so high that the secondary radiation, by means of which the defects or defective places with a dipole moment are created, is absorbed in this inner surface boundary layer.

As a result, the excitation energy is not absorbed at all, or is absorbed only in a very small portion of the wall adjacent its inner surface so that only small stresses appear. The majority of the laser tube thus remains free of stresses, and small defects, such as breaks or cracks do not spread throughout the wall of the laser tube which could lead to leakage of the laser tube.

Exemplary processes by which such profiles or gradients of doping material concentration can be produced are surface diffusion processes and ion exchange processes.

Figure 4A:
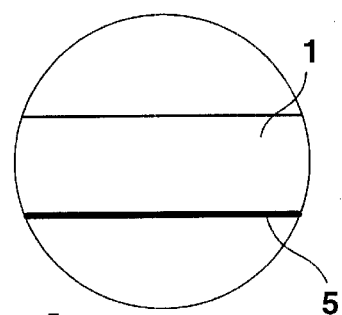
Figure 4B:
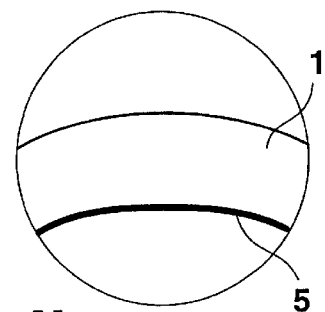

FIG. 4 shows a third embodiment in which the inner surface of the laser tube 1 is provided with a coating 5, by which the secondary radiation is absorbed or reflected. This inner coating prevents the creation of defective spots with a dipole moment to absorb the HF excitation energy in the material of the laser tube 1. The coating can be applied in very different ways; for example it can be deposited by evaporation. A preferred process to produce inner surface coated laser tubes is a sol-gel process.

Possible materials for the coating are titanium oxide, cerium oxide, zirconium oxide, or strontium oxide or a mixture of these oxides.

Figure 5A:
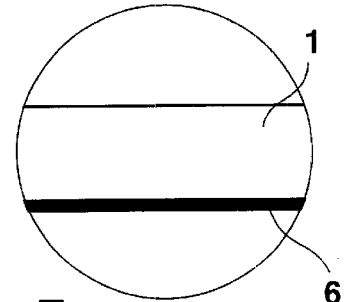
Figure 5B:
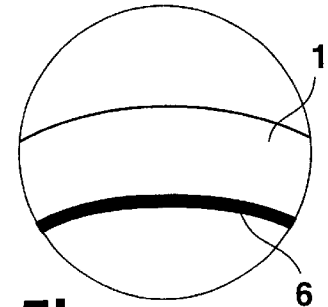

FIG. 5 shows a fourth embodiment in which a second tube 6, formed of a composition which absorbs and/or reflects the secondary radiation, is provided on the inner surface of the laser tube 1. This tube also prevents defects with a dipole moment from being created in the material of the laser tube 1.

As used in the claims, ceramic material includes quartz, ceramics and glass.

The measures described above can be used alternatively or cumulatively, in a given case with further measures, such as tempering or heat treatment of the laser tube.

Having thus described the invention, what is claimed is:

1. An HF-excited gas laser having:
   (a) a laser tube of quartz material with a peripheral wall and containing a lasing gas, said quartz material of said wall having dispersed therein a chemical component substantially precluding the passage therethrough of secondary radiation generated by said lasing gas, said secondary radioation having a wavelength in a proscribed range of less than 250 nm;
   (b) at least two electrodes (3) disposed externally of said laser tube and
   (c) a high frequency generator coupled to said electrodes and between which a high frequency alternating field is applied to excite said lasing gas in said tube which is disposed between said electrodes, said chemical component being in a concentration in an amount of at least 150 ppm and effective to substantially preclude passage of said secondary radiation through said wall and degradation of said quartz tube but not so large as to substantially adversely affect the properties of the quartz, said tube exhibiting low dielectric loss.

2. The gas laser in accordance with claim 1 wherein said composition of said quartz material is homogeneous throughout said wall.

3. The gas laser in accordance with claim 1 wherein said chemical component is dispersed primarily in said portion of said wall adjacent the inner surface of said laser tube (1).

4. The gas laser in accordance with claim 3 wherein said chemical component is introduced into said quartz material of said laser tube by a surface diffusion process or an ion exchange process.

5. The gas laser in accordance with claim 1 wherein said chemical component is selected from the group consisting of titanium oxide, cerium oxide, strontium oxide, and mixtures thereof.

6. The gas laser in accordance with claim 1 wherein said quartz contains titanium oxide in an amount of about 500 ppm.

* * * * *